United States Patent Office 3,018,636
Patented Jan. 30, 1962

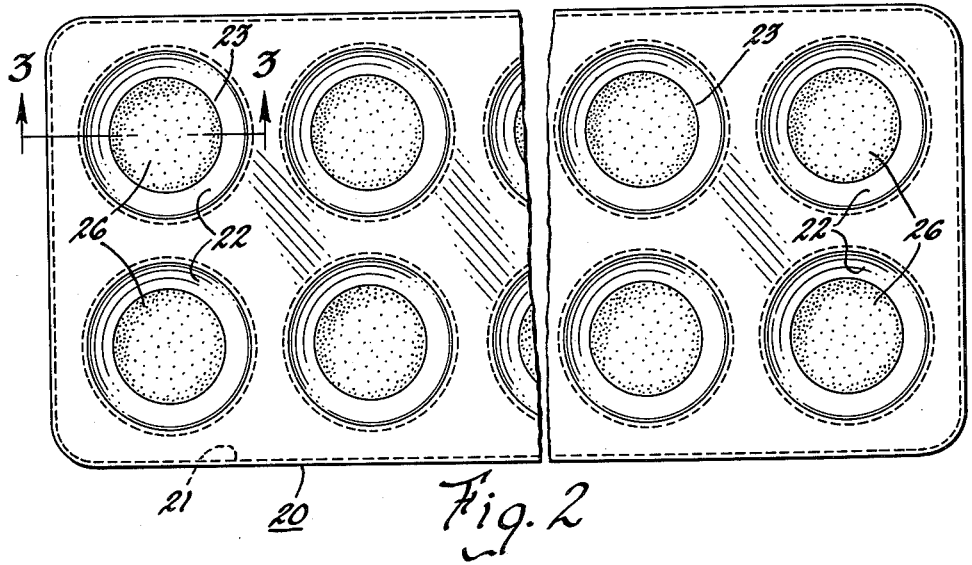
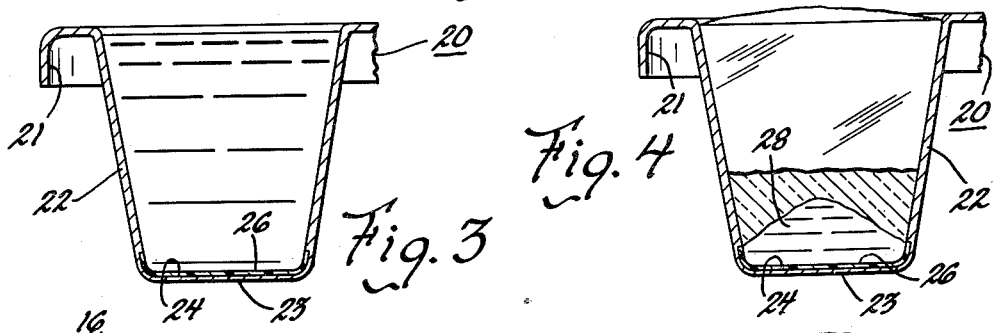
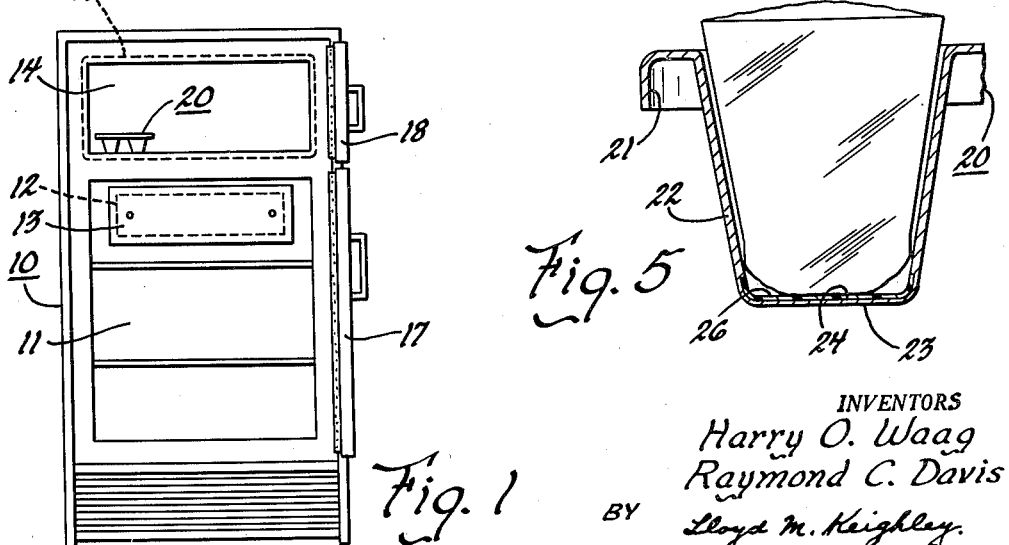

3,018,636
FREEZING DEVICE
Harry O. Waag and Raymond C. Davis, Dayton, Ohio, assignors to General Motors Corporation, Detroit, Mich., a corporation of Delaware
Filed May 19, 1960, Ser. No. 30,130
2 Claims. (Cl. 62—135)

This invention relates to refrigeration and particularly to a freezing device adapted to be located in a freezing or frozen food chamber of a cabinet of a household refrigerator.

An object of our invention is to provide an improved means or automatic method of loosening ice blocks from a mold member of a freezing device in which the blocks are frozen.

Another object of our invention is to utilize a great force created by an expanding mass during freezing of a liquid in a compartment of a mold of a freezing device for, in addition to breaking a bond between a block of ice and walls of the compartment, also shifting the block outward thereof so as to permit harvesting of the ice block therefrom.

In carrying out the foregoing objects, it is a further object of our invention to effect the loosening of an ice block from a compartment of a mold and shifting of the block relative thereto automatically and without incorporating moving parts in the construction of the mold.

A still further and more specific object of our invention is to provide an open top ice block compartment in a mold member of a freezing device which is exposed to a below-freezing temperature with a material forming an insulating liner along the inner surface of the compartment bottom wall or a means to reduce the rate of heat transfer through this wall to a body of liquid in the compartment below the rate of heat transfer through upright walls of the compartment to the liquid for freezing liquid in the lower part of the compartment subsequent to freezing a solid block in the upper part thereof, whereby to utilize the subsequent freezing for loosening and shifting the block outwardly of the compartment.

Further objects and advantages of the present invention will be apparent from the following description, reference being had to the accompanying drawings wherein a preferred embodiment of the present invention is clearly shown.

In the drawings:

FIGURE 1 is a front view of a cabinet of a refrigerating apparatus showing doors leading to chambers within the cabinet in open position to disclose a freezing device located in a freezing chamber of the apparatus;

FIGURE 2 is a top plan view of the freezing device shown in the cabinet of FIGURE 1 depicting a plurality of mold compartments therein constructed in accordance with our invention;

FIGURE 3 is an enlarged vertical sectional view taken along the line 3—3 of FIGURE 2 showing a body of liquid in a compartment of one of the molds;

FIGURE 4 is a sectional view similar to FIGURE 3 illustrating a solid ice block frozen in the upper part of the mold compartment prior to freezing liquid in the lower part thereof; and FIGURE 5 is a sectional view similar to FIGURES 3 and 4 showing in a somewhat exaggerated fashion a completely formed ice block shifted outwardly relative to the mold compartment.

Referring to the drawings, for illustrative purposes, there is shown in FIGURE 1 a refrigerating apparatus including a cabinet 10 of a household refrigerator having insulated walls forming a multiplicity of chambers therein. Cabinet 10 is provided with a lower unfrozen food storage chamber 11 which is cooled to a temperature of from, for example, 37° to 45° F. by a plate-like sheet metal evaporator 12 of a refrigerating system associated with the cabinet, which evaporator is mounted on and spaced from the rear wall of chamber 11 behind a protecting cover or baffle 13. Cabinet 10 is also provided with an upper or frozen food storage chamber 14 which is cooled to a temperature well below 32° F. for the storage of frozen foods, for freezing foods and/or for freezing a liquid such as water in a freezing device removably disposed in chamber 14 into ice blocks for table use in chilling salads or the like, and drinks in glasses. Chamber 14 is refrigerated by an evaporator 16 of the refrigerating system associated with cabinet 10, which evaporator is in the form of a conduit coiled or wrapped around the outside of and secured in metal-to-metal contact to a cam-like member forming a metal liner of chamber 14. Doors 17 and 18 are hingedly mounted on cabinet 10 to provide individual closures for the chambers 11 and 14 respectively as is conventional in the art. Freezing chamber 14 has one or more freezing devices, generally indicated by the reference numeral 20, removably supported on the refrigerated bottom wall thereof, which are adapted to contain water or other liquid to be frozen into blocks in a manner and for a purpose according to our invention.

Before proceeding with the description of the present invention, it is desired to point out that the freezing of a solid partial ice block in the upper part of an inflexible immovable walled mold and utilizing subsequent freezing of liquid below the partial block to shift a complete ice block relative to the mold has not previously been successful or practical. There are several factors involved in utilizing this principle which those proficient in the art have not recognized or solved. In the first place and regardless of how a mold or a freezing device containing such molds is supported in a freezing chamber, there is not enough unfrozen liquid remaining in the mold below a solid ice block in the upper portion thereof to freeze and expand a sufficient distance at a precise or predetermined low temperature to shift the block far enough out of the mold to enable it to be grasped and removed therefrom. Secondly, the last of the freezing and expanding liquid in such molds usually bonds tightly to a wall of the mold and further complicates or prevents the frozen block to be harvested from the mold. Thus, improvements or refinements in utilizing the freezing mass of an ice block in a mold for shifting the completely frozen block outward of the mold without the aid of additional means are necessary if this principle is to be practical or become a reality in the ice block freezing and harvesting art. The present invention therefore relates to such refinements or improvements and they should become apparent from the following disclosure.

Referring now to FIGURE 2 of the drawings it will be noted that each of several freezing devices 20 to be removably placed in freezing chamber 14 of cabinet 10 includes a tray or pan-like element having a down-turned bounding rim 21 to facilitate handling thereof. The freezing device tray or pan element includes a plurality of, preferably although not necessarily, cylindrical in horizontal cross-section molds, each comprising a metallic member providing upright walls 22 and a closed bottom wall 23 of an open top compartment in the molds (see FIGURE 3). Walls 22 are inclined with respect to the vertical or, in other words, converge downwardly to provide with wall 23 an open top cup-like compartment. The mold members may, if desired, be individually fabricated or shaped and removably carried by the tray or pan element instead of being formed integral therewith, as shown. Walls 22 and 23 of the mold members can be formed of heavy gauge sheet aluminum or cast from such material and these walls are integral, inflexible and immovable with respect to one another and to the content of a mold compartment. Such structure is to distinguish the present mold members from molds having resilient or flexible walls movable relative to each other and the specified closed compartment bottom wall is to differentiate from molds wherein an opening is provided in the bottom thereof for supplying air or fluid under pressure beneath an ice block frozen therein to effect a shifting of the block with respect to the mold compartment. The inner surface of bottom wall 23 and a short portion of the inner surface of upright walls 22 of the mold compartment are undercut as at 24 and these surfaces receive and have secured thereto a nonmetallic material or a material having a coefficient of heat transmission below a predetermined coefficient of heat transmission of the metal walls 22 and 23 forming a liner 26 along the undercut surfaces of the compartment. Undercut surface 24 and the liner 26 thereon should extend at least along the entire bottom wall 23 to entrap a wide substantial body of liquid in the bottom of the mold compartment for insuring a diaphragm or bellows-like movement of ice as this liquid is fast frozen. Liner 26 provides a means associated with a mold member for reducing the rate of heat transfer through bottom wall 23 to a body of liquid in the mold compartment below the rate of heat transfer through walls 22 to the liquid for a purpose to be hereinafter described. The liner 26 may comprise a layer of Bakelite molded to the undercut surface 24 or a disk made of rubber or rubber-like material inserted into the mold compartment, pressed into the undercut bottom portion thereof and sealed in place thereat in any suitable or conventional manner. Undercut surface 24 may receive a filler or layer of a desired material by painting or spraying a liquid mixture thereof thereover and drying or baking the mixture to provide a nonmetallic liner for the bottom of the mold compartment. Liner 26 could comprise a layer or coating of polytetrafluoroethylene which is sold under the trade name of "Teflon." All of the materials mentioned are preferably abrasion resistant, water repellent and of low adhesion properties with respect to water and ice. If liner 26 is to be established or formed of a layer or coating of "Teflon" it may be applied to the surface or surfaces 24 in a manner such, for example, as described in the Stanley R. Prance et al. Patent 2,878,659 dated March 24, 1959, and assigned to the assignee of the present application. However, the liner in the present disclosure would, of course, be of a much thicker character than the thin "Teflon" coating disclosed in the Prance et al. patent so as to be a realistic and effective heat transmitting insulator. Thus, liner 26 insulates the lower portion of a body of liquid, such as water, adapted to be contained in the mold compartment to be frozen therein into an ice block from the metal of the mold.

When the compartments of the mold members of freezing device 20 are substantially filled with water or other liquid, as shown in FIGURE 3, and the freezing device is placed in freezing chamber 14 of refrigerator cabinet 10, the liquid is chilled to a temperature well below 32° F. by the refrigerating effect produced by evaporator 16. By virtue of the fact that liquid in the lower part of a mold compartment contacting liner 26 is heat insulated from the compartment walls 22 and 23, the liquid in the compartment freezes from the top downwardly, as shown in FIGURE 4. Transmission of heat from the liquid in the lower part of the mold compartment to the metal wall of chamber 14, and consequently to evaporator 16, is retarded while good conductivity from heat of liquid in the upper part of the compartment is established through the metal of the mold. In this manner a solid partial ice block is frozen in the upper part of a mold compartment and a quantity of unfrozen liquid indicated at 28 is trapped between the ice block and bottom wall 23 of the compartment (see FIGURE 4). This trapped liquid 28, by virtue of being insulated from the mold compartment walls both by the ice block and by the nonmetallic liner 26, remains in a liquid state until the temperature in chamber 14 is reduced far below water freezing temperature or until after the solid ice block is formed in the upper part of the compartment. At the time the temperature of the mold and trapped liquid therin is reduced to this lowered degree, liquid 28 quickly freezes and expands. This is highly desirable and advantageous as distinguished from gradually or progressively freezing a trapped body of liquid beneath a solid ice block. The fast freezing and rapid expansion of this substantial volume of trapped liquid 28 creates somewhat of a snap-acting force that is applied to the closed compartment bottom wall 23 and which force reacts thereagainst to serve, without the aid of additional means, to simultaneously loosen the frozen ice block from walls of the compartment and to shift it upwardly relative to wall 23 along walls 22 outward of the open top of the compartment, as shown in FIGURE 5.

By virtue of the water repellent or low adhesion properties to ice of the insulating coating or liner 26, forming the inner surface of bottom wall 23 of a mold compartment in the present disclosure, the final freezing of liquid 28 to provide a complete and shifted ice block will not bond or strongly adhere to the bottom of the mold compartment. Also, by virtue of the quick freezing of the trapped liquid 28 at a predetermined low temperature, below that at which liquid in the upper part of the mold compartment freezes instead of gradual freezing of the liquid 28, a greater distance of upward movement of the ice block out of the compartment is achieved. Thus the upper part of the ice block is shifted to a point outwardly of the mold compartment above the top of pan-like freezing device 20 to permit its being grasped by fingers of a person's hand or to be engaged by suitable ice tongs for removing a desired number of ice blocks therefrom. If all of the ice blocks are desired to be harvested from freezng device 20 simultaneously, this device is removed from chamber 14 of refrigerator 10 rotated into an inverted position over an ice receiving receptacle and tapped, jarred or shaken whereupon, due to the non-bonding or infinitesimal adherence of the lower portion of the loosened ice block to liner 26, the ice blocks will freely fall out of their compartments of device 20 into the receptacle.

By our refined or improved and unique arrangement, we are enabled to attain results never before had to produce the ultimate in freezing a body of liquid in an open-top, closed bottom mold compartment into an ice block and of employing the freezing liquid of the block itself for loosening the block from walls of the compartment, for preventing bonding of the loosened block to these walls, and for shifting the block a substantial distance outward of the compartment.

It should, from the foregoing, be apparent that we have provided a mold member or freezing device construction wherein ice blocks are frozen and automatically loosened therefrom, which member or device is devoid of moving parts and is therefore not likely to break or become inoperative. Our improvement overcomes problems encountered in prior art devices of this type, eliminates fallacies thereof, and by omitting moving parts its manufacturing cost is greatly reduced.

By actually insulating that portion of a body of liquid in the lower part of an ice block forming compartment from the compartment bottom wall by the insulator liner and from the metallic upright compartment walls as the ice block forms our freezing device leaves nothing to conjecture insofar as its positive operation is concerned. The insulation means or liner and its point of location insures that the rate of heat transfer through the mold compartment bottom wall to liquid therein is under all conditions reduced below the rate of heat transfer to the liquid through the compartment upright walls which is essential in a device of this character. Thus, the feature of insulating the lower portion of the body of liquid in a mold compartment from the compartment bottom wall and from the metal of the mold member by ice of a block being formed above the bottom wall are fundamentals rendering the principle herein involved successful and practical in use.

While the embodiment of the present invention as herein disclosed constitute a preferred form, it is to be understood that other forms might be adopted.

What is claimed is as follows:

1. In combination, a refrigerator having a refrigerating system associated therewith and provided with a refrigerating support within a chamber of the refrigerator, a freezing device comprising immovable metal walls forming upstanding sides converging toward a flat bottom compartment adapted to contain a body of water to be frozen, said device being adapted to be placed in an upright position upon said refrigerated support with said flat bottom of the compartment in direct contact therewith, nonmetallic material extending across the inner surface of said flat bottom of said compartment and upwardly therefrom around lower corners thereof a short distance along said upstanding sides thereof, said material providing an insulating liner for said compartment disposed between water therein and said refrigerated support while the device is supported thereon whereby to freeze a solid block of ice in the upper portion of said compartment before any water of the body thereof contacted by said liner is frozen, and the immovability of the bottom and sides of said device causing a final freezing of the water to expand and react against the bottom of said compartment for substantially simultaneously loosening said ice block from walls of the compartment and for shifting same upwardly relative to said compartment bottom.

2. In combination, a refrigerator having a refrigerating system associated therewith and provided with a refrigerated support within a chamber of the refrigerator, a freezing device comprising walls immovable with respect to one another forming upstanding sides converging toward a generally flat bottom compartment adapted to contain a body of water to be frozen, said freezing device being placeable in an upright position upon said refrigerated support with said flat bottom of the compartment in direct contact therewith, the flat bottom and a part of the sides of said compartment extending a short distance upwardly from said bottom, interposed between water in the compartment and said support, having a rate of heat transfer from the water to the support below that of the upstanding compartment sides whereby a solid block of ice is frozen in the upper portion of said compartment before water in the lower portion thereof freezes, and said immovability of the bottom and sides of said device causing final freezing of the body of water to expand and react against said bottom of the compartment for self-loosening said ice block from walls of said compartment and for simultaneously shifting the block of ice upwardly relative to the bottom of the compartment.

References Cited in the file of this patent

UNITED STATES PATENTS

| | | |
|---|---|---|
| 1,824,309 | Storer | Sept. 22, 1931 |
| 1,976,147 | Smith | Oct. 9, 1934 |
| 2,037,417 | Hull | Apr. 14, 1936 |
| 2,100,288 | Horlacher | Nov. 23, 1937 |
| 2,415,446 | Shoemaker | Feb. 11, 1947 |